United States Patent [19]
Elonen

[11] 4,057,286
[45] Nov. 8, 1977

[54] RETAINING MEMBER FOR VEHICLE CHASSIS

[75] Inventor: Kunto Elonen, Tampere, Finland

[73] Assignee: Rauma-Repola Oy, Finland

[21] Appl. No.: 635,430

[22] Filed: Nov. 26, 1975

[51] Int. Cl.² .............................................. B60P 7/06
[52] U.S. Cl. ..................... 296/43; 105/380; 280/145
[58] Field of Search ............... 296/43; 280/143, 144, 280/145, 147; 105/380, 381, 383, 390, 382

[56] References Cited

U.S. PATENT DOCUMENTS

| 832,588 | 10/1906 | Bridges et al. ................ 105/381 |
| 1,089,767 | 3/1914 | Johnston ..................... 280/144 |
| 2,275,333 | 3/1942 | Younce, Sr. .................. 280/145 |
| 2,677,552 | 5/1954 | Dodds et al. ................. 280/145 |
| 2,728,588 | 12/1955 | Zepik ........................ 280/145 |
| 3,356,387 | 12/1967 | Skirvin et al. ................ 296/43 |
| 3,661,420 | 5/1972 | Swanson et al. ............... 296/43 |

FOREIGN PATENT DOCUMENTS

| 737,594 | 6/1943 | Germany ..................... 280/145 |
| 17,444 | 7/1908 | United Kingdom ............. 105/381 |

Primary Examiner—Peters, Jr., Joseph F.
Assistant Examiner—David M. Mitchell
Attorney, Agent, or Firm—Burns, Doane, Swecker & Mathis

[57] ABSTRACT

This invention relates to an improved vehicle retaining means comprising a plurality of retaining members, each of said retaining members being rotatably journalled in a bearing, each of said bearings being located proximate a side of a vehicle chassis, each of said bearings being tilted outwardly with respect to a perpendicular line to the plane of the chassis.

4 Claims, 4 Drawing Figures

RETAINING MEMBER FOR VEHICLE CHASSIS

This invention relates to vehicles and more particularly, relates to improved retaining means for a vehicle adapted to transport a commodity.

Often, in trucks, tractors or like vehicles which are employed for carrying timber or logs, the logs are loaded on the vehicle chassis which includes a plurality of uprightly extending members rigidly secured to the chassis and adapted to retain the logs on the vehicle. In most such vehicles, it is desirable to transport as large a volume as practical at any one time and thus, frequently the loading area is wider than the width of the wheels. In such as case, the rigid retaining members often strike trees or like obstacles as the vehicle is maneuvering. This frequently results in damage to the rigid retaining members or breakage thereof. In order to minimize the breakage and/or damage, it is necessary to employ retaining members of a very high strength material.

The present invention provides a retaining means comprising at least one retaining member which overcomes some of the problems associated with the prior art rigid retaining members.

According to the aspect of the present invention, in a vehicle adapted for transport of a commodity and having retaining means for retaining the commodity on the chassis of the vehicle, there is provided the improvement wherein said retaining means comprises at least one retaining member, said retaining member being rotatably journalled in a bearing, said bearing being mounted proximate an edge of said chassis and being angled outwardly with respect thereto.

In greater detail, the present invention provides a "crank shaped" retaining member turnably or rotatably mounted on the chassis of a vehicle transporting commodities such as logs or timber. As aforementioned, for economic reasons, the load space of such vehicles is usually made as wide as possible and as a result, the retaining member frequently hits trees or other obstacles along the path the vehicle follows as it turns and maneuvers in the forest road. The retaining member of the present invention is rotatably journalled in a bearing whereby the impact forces are partially absorbed by the retaining member leading to less breakage and as well, permitting the usage of lighter weight retaining members.

In order to maintain the loading space as wide as possible during the loading operation, the retaining member according to the present invention automatically assumes a position wherein the retaining member is gravitationally forced outwardly with respect to the vehicle chassis. This is accomplished through the use of a bearing which is inclined with respect to a perpendicular line passing through the chassis of the vehicle.

The vehicle with which the improved retaining member of the present invention is employed may be any suitable and conventional. Thus, for example, the present invention resides in the use of the retaining member whether the same be employed in a tractor, truck or other vehicle.

The retaining member per se may be manufactured of any suitable material and in terms of frequent usage, wood materials may be employed.

The bearing in which the retaining member is journalled may be of any conventional type of bearing and may be mounted in any desirable manner on the chassis or a frame member of the vehicle.

In a preferred embodiment, the retaining member is a one-piece unit rotatably journalled in the bearing and is somewhat "crank-shaped". As will be appreciated, any suitable number of such retaining members may be employed. The retaining members have the retaining portion thereof conventionally in a substantially perpendicular condition with respect to the chassis or "bed" of the vehicle although this need not necessarily be so. In conjunction with the above, a plurality of horizontal retaining means such as wood boards running perpendicular to the retaining members and attached thereto may be employed. These retaining means may be utilized on the side walls of the vehicle and if so desired, on the end walls thereof.

Having thus generally described the invention, reference will be made to the accompanying drawings illustrating an embodiment thereof, and in which.

Figure 1:
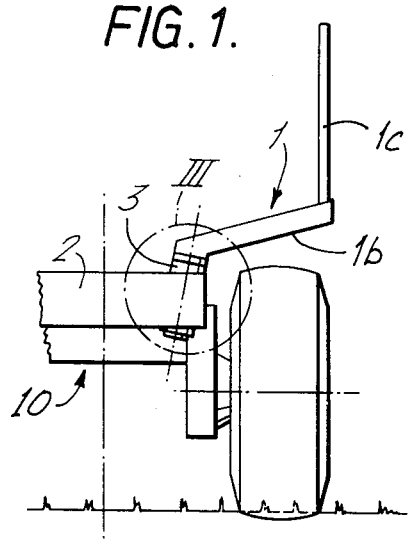
FIG. 1 is a front view of a portion of a vehicle employing a retaining member according to the present invention.

Referring to the drawings in greater detail and by reference characters thereto, there is illustrated in FIG. 1 a portion of a wheeled vehicle designated generally as 10, having the retaining member of the present invention mounted thereon.

Briefly, the retaining member 1 portion 1a which is rotatably journalled in a bearing 3 which is mounted in a tilted fashion in chassis 2 of the vehicle.

Figure 3:
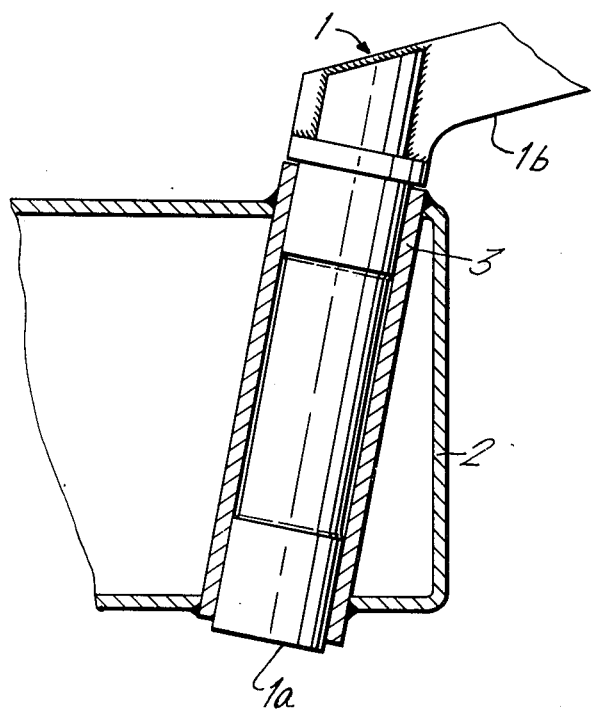
FIG. 3 is an enlarged view illustrating in greater detail the bearing employed in FIGS. 1 and 2.

As may be seen in detail from FIG. 1 and 3, retaining member 1 has a first portion 1a which is rotatably journalled in bearing 3, a second portion 1b, extending generally horizontally outward from first portion 1a, and a third portion 1c, extending generally vertically upward from second portion 1b. The longitudinal axis of bearing 3 is tilted sufficiently from the perpendicular to chassis 2, and the three portions of retaining member 1 are joined at such respective angles that when retaining member 1 is permitted to rotate under the influence of gravity, retaining member 1 will always assume the position shown in FIG. 1, i.e., second portion 1b assumes an upward and outward extension away from; chassis 2 and the third portion assume a position generally perpendicular to the chassis.

Figure 2:
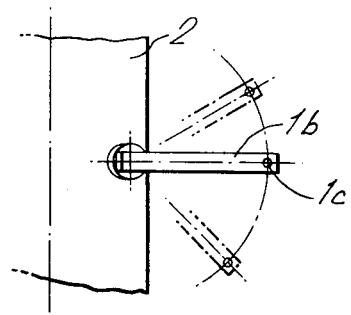
FIG. 2 is a top view of FIG. 1.

In FIG. 2, as is schematically illustrated, it may be seen that force applied to the retaining member 1 will tend to rotate the same due to the retaining member being rotatably journalled in bearing 3. In turn, the outward positioning of retaining member 1 is due to the tilted configuration of the bearing as is illustrated in greater detail in FIG. 3.

Figure 4:
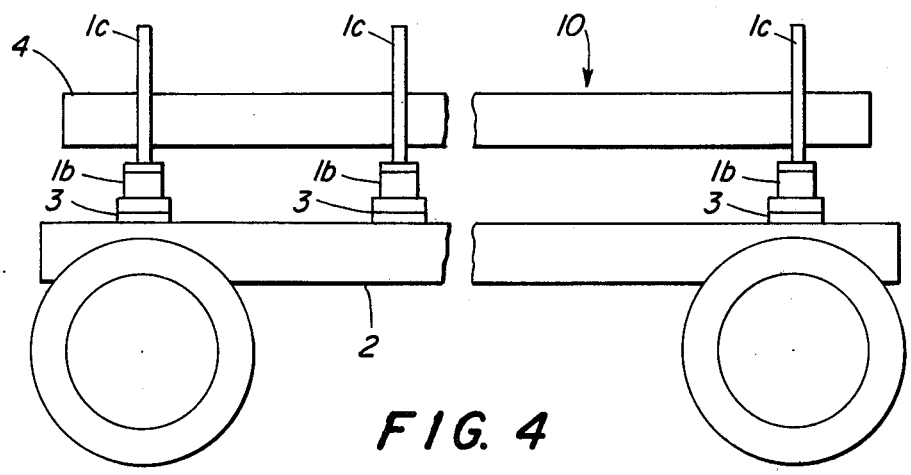
FIG. 4 is a side elevation of the vehicle of FIG. 1 showing the horizontal retaining members attached to the rotatable retaining members.

Referring to FIG. 4, there is seen the previously referred to optional construction wherein a horizontal retaining means 4, secured to the vertical portion 1c by any suitable means (not shown), is utilized as a side wall for the vehicle.

This construction provides a simple, reliable and economical retaining member when compared to known constructions presently in use.

It will be obvious that many modifications may be made to the above described embodiment without departing from the spirit and scope of the present invention. Thus, though only one retaining member is illustrated, any number of such members may be employed on opposed sides of the vehicle or chassis. Furthermore, said plurality of retaining members on the same marginal edge of the chassis may be secured together by any suitable means. It is the rotatable mounting of the retaining member and the tilted mounting of the bearing in the chassis which permits the achievement of the objects of the present invention.

The embodiments of the invention in which an exclusive property or privilege is claimed are defined as follows:

1. In a vehicle adapted to transport a commodity and having means for retaining the commodity on the chassis of the vehicle, the improvement comprising:
    a. a bearing mounted on said chassis, said bearing having a longitudinal axis tilted upwardly and outwardly with respect to a line perpendicular to said chassis, and
    b. a rigid retaining member having a first portion thereof rotatably journalled in said bearing, a second portion extending generally horizontally outward from said journalled first portion, and a third portion extending generally vertically upward from said second portion, the longitudinal axis of said bearing being tilted sufficiently from the perpendicular to the chassis and the three portions of said retaining member being joined to each other at such respective angles that, when said retaining member is permitted to rotate under the influence of gravity, said second portion assumes an upward and outward extension away from the chassis and said third portion assumes a position generally perpendicular to the chassis.

2. The vehicle of claim 1 wherein there is provided a plurality of said retaining members.

3. The vehicle in accordance with claim 1 wherein a plurality of said bearings is secured to said chassis proximate a side thereof, each of said bearings having one of said retaining members journalled therein.

4. The vehicle of claim 3 wherein said plurality of retaining members are joined together by at least one further member extending between said plurality of retaining members and being substantially parallel to the side of said vehicle.

* * * * *